G. LUNT.
APPARATUS FOR MAKING DOUGH.
APPLICATION FILED JAN. 24, 1910.

1,048,327.

Patented Dec. 24, 1912.

3 SHEETS—SHEET 2.

G. LUNT.
APPARATUS FOR MAKING DOUGH.
APPLICATION FILED JAN. 24, 1910.

1,048,327.

Patented Dec. 24, 1912.

3 SHEETS—SHEET 3.

WITNESSES:

INVENTOR
George Lunt
BY
Attorneys

UNITED STATES PATENT OFFICE.

GEORGE LUNT, OF FORMBY, ENGLAND.

APPARATUS FOR MAKING DOUGH.

1,048,327. Specification of Letters Patent. Patented Dec. 24, 1912.

Application filed January 24, 1910. Serial No. 539,836.

*To all whom it may concern:*

Be it known that I, GEORGE LUNT, a subject of the King of Great Britain, residing at Formby, in the county of Lancaster, in the Kingdom of England, have invented certain new and useful Improvements in Apparatus for Making Dough, of which the following is a specification.

This invention has for its object an apparatus for making dough, by which the ingredients of the dough are quickly mixed and blended together, and formed into a coherent mass, and such a mingling of the several elements of the dough obtained, that a practically perfect homogeneity is secured. The superiority in whiteness of the dough produced by my machine and that produced by other machines, is very striking.

The invention will be understood from the following description, reference being had to the accompanying drawings, in which:—

Figure 1:
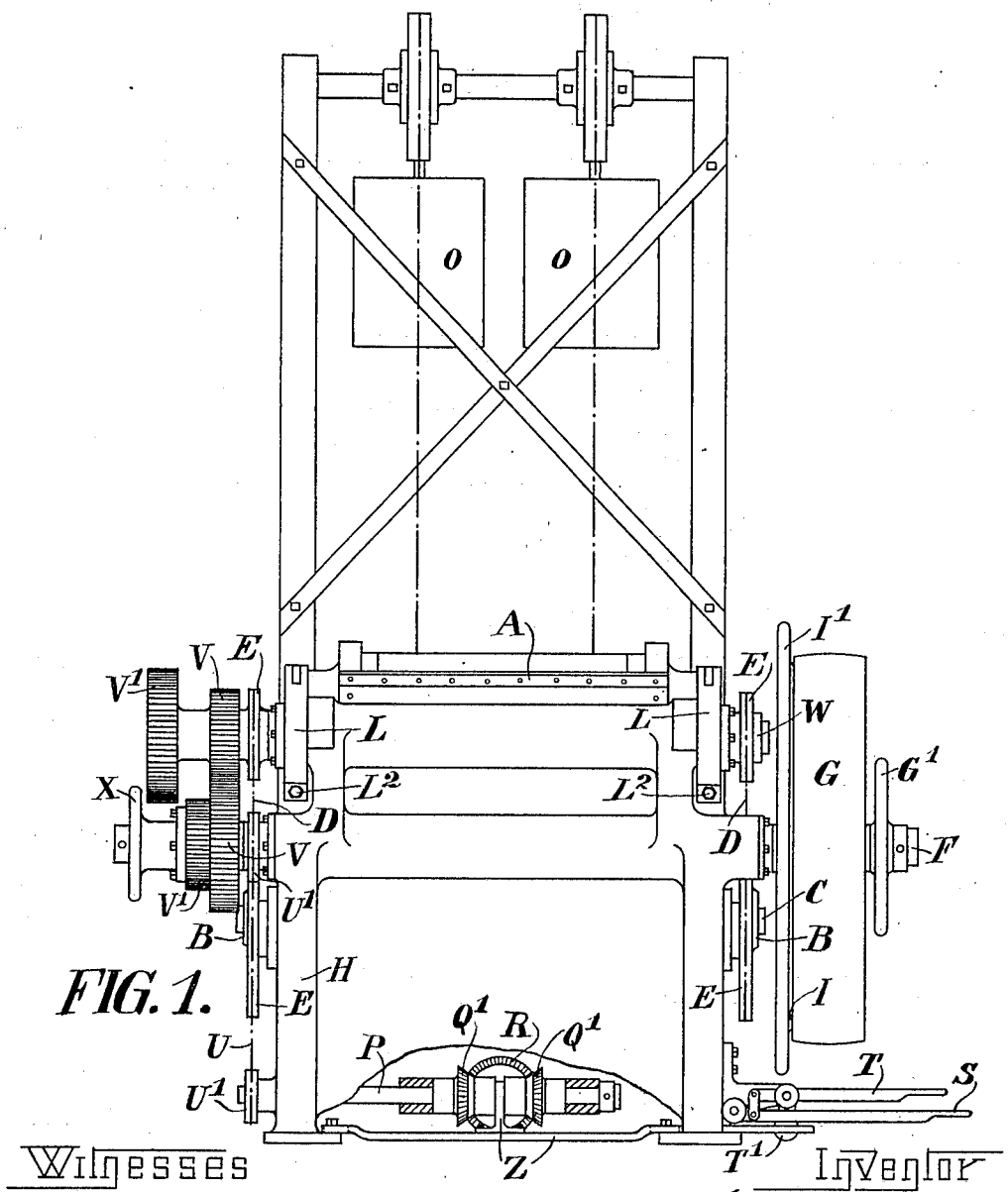
Figure 2:
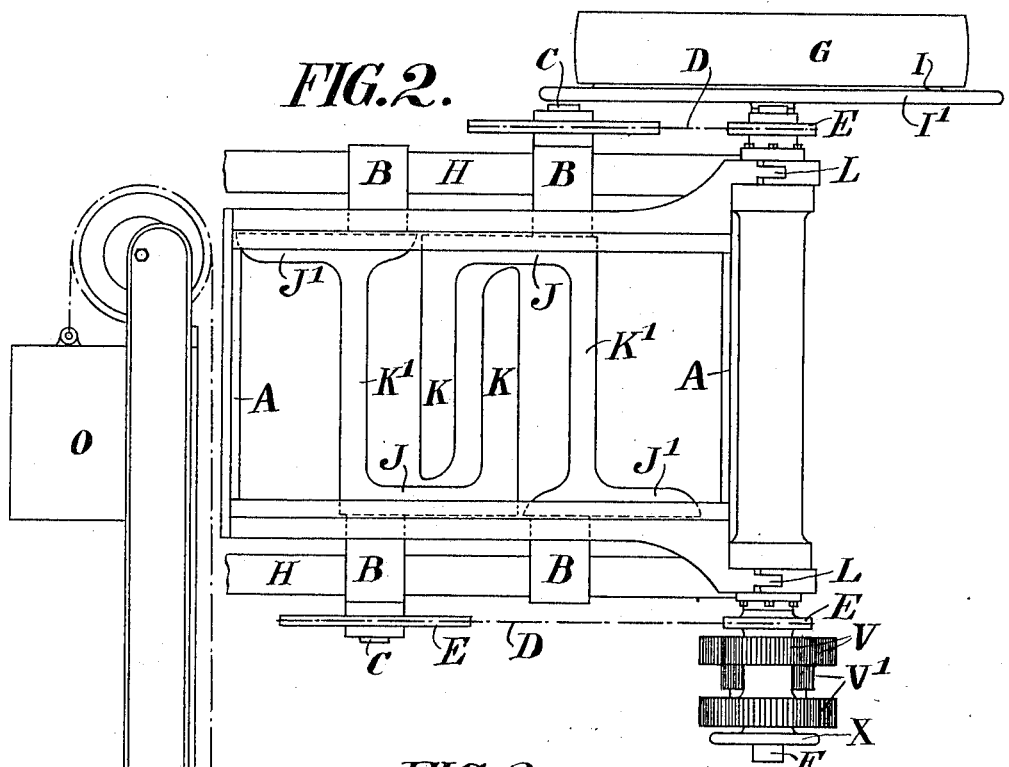
Figure 3:
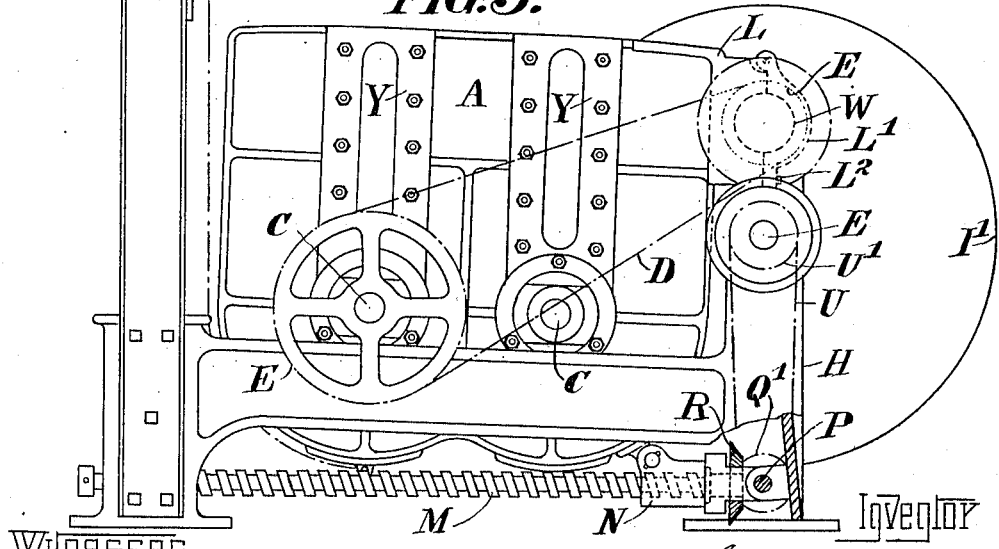
Figure 4:
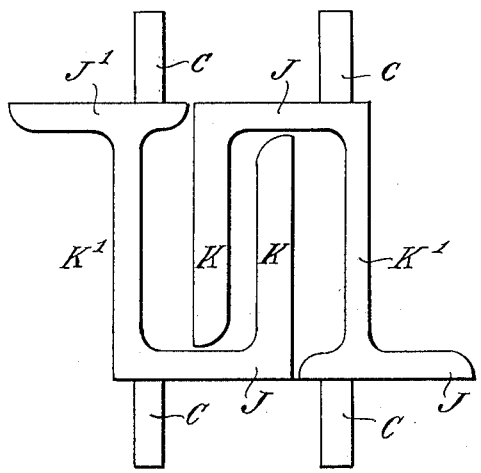
Figure 5:
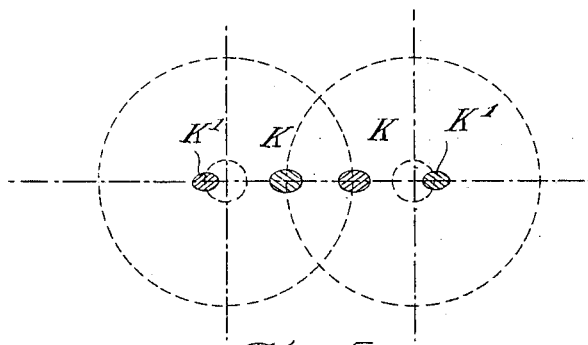

Figure 1 is an end view of the machine; Fig. 2, a plan view; Fig. 3, a side elevation. Fig. 4 is a plan view showing the mixing and stretching members alone, and Fig. 5 is a diagrammatic view showing more clearly the paths of movement of said mixing and stretching members.

In carrying my invention into effect, my machine embodies a receptacle or chamber A adapted to contain the ingredients of the dough, such as flour, water, yeast, et cetera, and wherein the dough is formed into a coherent mass. Journaled at B in this receptacle or chamber A are two substantially parallel rotary shafts C on opposite sides of the said chamber. They are rotated by any suitable gearing in the same or opposite directions such as by the chains D and sprocket wheels E driven by the driving pulley G which is mounted loosely on the shaft F supported in bearings in the framework H. I is a clutch cone firmly keyed to the shaft F which can be shifted by turning the handle $I^1$ so as to engage the pulley G, and cause the shaft to partake of the pulley's rotation by frictional adherence. The toothed wheels V communicate the motion of the shaft F to the shaft W which drives the sprocket wheel E. To the end of each shaft B and inside the receptacle or chamber A, a lever J is secured so as to rotate therewith, and one lever travels close to one wall of the chamber A and the other close to the opposite wall of the chamber. To each lever J are secured two arms K $K^1$ projecting laterally across the chamber, the arms of these levers projecting in opposite directions. The arms of each lever are located on opposite sides of, and at different distances from, their shaft axis. The arms $K^1$ nearest the axes, move in non-intersecting paths, and those K farther away from the axes move in intersecting paths. These arms can be circular, elliptical or any other suitable shape in cross section. A suitable shape is to make their faces that come into contact with the dough, wide, so as not to cut the dough but act so as to stretch it. The shafts C are shown made in two lengths, journaled on opposite sides of the machine, and each length provided with a lever (namely the levers J and the levers $J^1$) traveling close to the sides of the chamber A, and at a short distance from the axis the levers J $J^1$ of each pair are connected together by an arm $K^1$. These arms $K^1$ travel in paths that do not intersect each other. On the other side and farther away from the axis, one of the levers viz., J in each pair has an arm K, and these arms travel in intersecting paths. The said latter arms K project in opposite directions, and their free ends terminate short of the other lever in each pair.

The chamber A is mounted between the members of the framework H, and at one side near the top is journaled at L to the shaft W, so that it can be turned through the segment of a circle, to tip out the contents. The tipping can be effected mechanically by means of a screw M, provided with a nut N which travels longitudinally when the screw M is rotated. The nut is secured to the chamber, so that the moving of the nut to the right will turn the chamber A into the tipping position, the counterweights O assisting in this, while if the nut be moved to the left, the opposite action will take place. The screw M is mounted in a frame whose axis is at P, so that it swivels with the chamber A. The screw is operated by a double clutch from the shaft P, so that the shaft will drive the screw M in either direction. This clutch consists of bevel wheels Q $Q^1$ secured by a feather on the shaft P. In the position shown, they are in the middle position out of gear with the bevel wheel R, but by depressing the treadle T the bevel wheel $Q^1$ is by means of the crank $T^1$ and rod Z thrown into gear with the bevel wheel R and raises the treadle S, or by depressing the treadle S the treadle T is raised, the bevel wheel Q¹ thrown out of gear, and the bevel wheel Q thrown into gear with the wheel R, thus reversing the rotation of the screw. The shaft P is driven from the shaft F by the chain U and sprocket wheels U¹. The speed of the shaft W and consequently of the arms or mixers K K¹ can be varied by providing in addition to the gear wheels V the wheels V¹. By turning the handle X the spur wheel V is thrown out of gear with its pinion V, and the wheel V¹ thrown into gear with its corresponding wheel V¹, thus varying the speed of the shaft W.

The sides of the dough receptacle A are provided with vertical slots extending from the top downward for about two thirds of its depth, and the bottoms form journal bearings B for the rotary trunnions or shafts C. When the shafts C with their pulling or mixing members are in position, the plates Y are bolted to the sides of the receptacle A, so as to close or cover the slots, and these plates carry at the bottom, the upper part of the journal bearings for the trunnions C. To remove the trunnions C with their pulling or mixing members, all that is necessary therefore, is to take off the plates Y, and the trunnions can then be lifted out through the slots.

One half of the journal bearing L is carried by the receptacle A. The other part consists of a cap L¹ which is pivoted at one end, and at the other end is united to the receptacle A by bolts L² by means of which it is approached toward it to compensate for wear.

The ingredients being put into the machine, the shafts C are revolved, and in about a minute or so the materials are mixed by the arms K K¹ and form a coherent mass of soft dough. The rotation of the shafts C with their arms being continued, the arms coact together as pulling members, two of which arms travel in intersecting paths and the other two in non-intersecting paths, and so draw out, pull and stretch the dough, also break it up and mix it. Ultimately the dough gets so tenacious and elastic, that it extends from arm to arm in strings and membranes which are stretched and carried around by the arms and folded one upon the other, and are thrown off against the walls of the chamber and again caught by the arms and pulled out, stretched, and so on.

I have found that in about four or five minutes from the starting of the machine, the dough produced by this machine is equal or superior to dough produced by other machines in 7 to 10 minutes. The dough will be found to be of a perfectly homogeneous texture, and of a much whiter color than dough produced by other machines in a very much longer time. The chamber A can if desired be shaped to correspond more or less with the paths of rotation of the arms. The arms can be made adjustable if desired as to their distance from their respective axes of rotation.

I do not confine myself to using two shafts C, as if desired more than two shafts may be used, each provided with levers J and laterally disposed arms K K¹. Also if desired, each shaft can be provided with more than two arms, or one set of arms could be stationary and the others rotate in circular paths, or if desired one arm could be arranged to oscillate and the other arms arranged to rotate in circular paths. If desired, each shaft, instead of being made in two lengths journaled in opposite sides of the machine, can be made of one length only, journaled at one side of the machine with arms K K¹ projecting therefrom.

The mixing and stretching operations produced by this machine on the dough, may be continued for any length of time, and a dough is produced which is superior in color and strength to dough produced by the ordinary type of machine, and the resulting loaf will show a marked improvement in color and strength over any other.

I declare that what I claim is:—

1. An apparatus for making dough, the combination with a frame, of a receptacle mounted therein, shafts mounted in said receptacle, means for rotating said shafts, and compound pulling or mixing members mounted on said shafts adapted to rotate in intersecting and non-intersecting paths.

2. In apparatus for making dough, the combination with a mixing receptacle, parallel trunnions, pairs of levers carried by said trunnions transversely thereof and extending in opposite directions, an arm connecting each pair of levers adjacent to the inner ends of the latter, said arms of the levers being arranged to travel in non-intersecting paths, one lever of each pair aforesaid having a second arm projecting therefrom parallel to the arm which connects the levers, the second mentioned arms of the levers being arranged to travel in intersecting paths.

3. In apparatus for making dough, the combination with a mixing receptacle, of a plurality of co-acting sets of arms mounted to rotate within the receptacle some in intersecting paths and others in non-intersecting paths, and the leading faces of said arms made broad or flat in a direction radial with respect to the axis of the arms so as not to cut the dough, but act to stretch it.

4. In apparatus for making dough, the combination with a mixing receptacle of compound mixing and pulling members rotatable about suitable axes in said receptacle, each of said members being comprised of two elements adapted to move in different circular paths, the arrangement of corresponding elements of the aforesaid mixing and pulling members being such that the circular paths they travel intersect, and the arrangement of other corresponding elements of said members being such that they travel in non-intersecting paths.

In witness whereof, I have hereunto signed my name this 15 day of January 1910, in the presence of two subscribing witnesses.

GEORGE LUNT.

Witnesses:
GEO. C. DYMOND,
M. HAILES.

Copies of this patent may be obtained for five cents each, by addressing the "Commissioner of Patents, Washington, D. C."